(12) United States Patent
Shi et al.

(10) Patent No.: US 8,041,124 B2
(45) Date of Patent: Oct. 18, 2011

(54) IDENTIFYING COMPUTER GRAPHICS FROM DIGITAL PHOTOGRAPHS

(75) Inventors: Yun Qing Shi, Millburn, NJ (US); Wen Chen, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 996 days.

(21) Appl. No.: 11/624,595

(22) Filed: Jan. 18, 2007

(65) Prior Publication Data

US 2008/0175480 A1    Jul. 24, 2008

(51) Int. Cl.
G06K 9/62    (2006.01)

(52) U.S. Cl. ........ 382/224; 382/176; 382/180; 382/181; 382/190; 382/191; 382/192; 382/195; 382/206; 382/207; 345/418; 345/501; 345/581

(58) Field of Classification Search ............ 382/176, 382/180, 181, 190–192, 195–208, 224; 345/418, 345/501, 581

See application file for complete search history.

(56) References Cited

U.S. PATENT DOCUMENTS

| 5,805,213 | A  | * | 9/1998  | Spaulding et al. ......... 348/222.1 |
|-----------|----|---|---------|--------------------------------------|
| 6,751,363 | B1 | * | 6/2004  | Natsev et al. ................. 382/305 |
| 2003/0118234 | A1 | * | 6/2003  | Tanaka et al. ................. 382/173 |
| 2006/0257018 | A1 |   | 11/2006 | Shi et al.                             |
| 2007/0009160 | A1 | * | 1/2007  | Loo et al. ..................... 382/225 |
| 2007/0177791 | A1 |   | 8/2007  | Shi et al.                             |

OTHER PUBLICATIONS

Shi et al., Image Steganalysis Based on Moments of Characteristic Functions Using Wavelet Decomposition, Prediction-Error Image, and Neural Network, Jul. 2005, IEEE International Conference on Multimedia and Expo, pp. 1-4.*

G. Xuan et al., "Steganalysis Based on Multiple Features Formed by Statistical Moments of Wavelet Characteristic Functions," Information Hiding Workshop (IHW 05), Barcelona, Spain, Jun. 2005.

Y.Q. Shi et al., "Steganalysis Based on Moments of Characteristic Functions Using Wavelet Decomposition, Prediction-Error Image, and Neural Network," IEEE International Conf. on Multimedia and Expo (ICME 05), Amsterdam, Netherlands, Jul. 2005.

C. Chen et al., "Statistical Moments Based Universal Steganalysis Using JPEG 2-D Array and 2-D Characteristic Function," IEEE Int'l Conf. on Image Processing (ICIP 06), Atlanta, Georgia, Oct. 2006.

M. Weinberger et al., "LOCO-I: A Low Complexity Content-Based Lossless Image Compression Algorithm," Proc. of IEEE Data Compression Conf., pp. 140-149, 1996.

International Preliminary Report on Patentability issued in related International Application No. PCT/US2008/051314.

Lyu, S., et al., "How Realistic is Photorealistic?", IEEE Transactions on Signal Processing, vol. 53, No. 2, pp. 845-850, Feb. 2005.

(Continued)

*Primary Examiner* — Bhavesh Mehta
*Assistant Examiner* — Daniel Zeilberger
(74) *Attorney, Agent, or Firm* — Connolly Bove Lodge & Hutz LLP

(57) ABSTRACT

Computer graphics may be detected in digital images by extracting a first set of features from an input digital image, extracting a second set of features from a prediction-error image derived from the input digital image, and applying a classification algorithm to the first set of features and the second set of features to determine if the combined sets of features indicate that the input digital image corresponds to computer graphics.

40 Claims, 5 Drawing Sheets

OTHER PUBLICATIONS

Lyu, S., "Natural Image Statistics for Digital Image Forensics," Ph.D. Thesis, Dartmouth College, Dartmouth, NH, USA, Chap. 2, Aug. 2005.

Cutzu, F., et al., "Estimating the Photorealism of Images: Distinguishing Paintings from Photographs," Proc. 2003 IEEE Conf. on Computer Vision and Pattern Recognition, vol. 2, pp. 305-312, Jun. 2003.

Chen, Y., et al., "Automatic Classification of Photographs and Graphics," 2006 IEEE Conf. on Multimedia and Expo, pp. 973-976, Jul. 2006.

PCT Search Report and Written Opinion, PCT/US2008/051314, Aug. 4, 2008.

* cited by examiner

IDENTIFYING COMPUTER GRAPHICS FROM DIGITAL PHOTOGRAPHS

FIELD OF THE INVENTION

Embodiments of the present invention may be directed to the detection of computer graphics from digital photographs.

BACKGROUND OF THE INVENTION

For the purposes of this application, "computer graphics" will be used to refer to creating pictures via computer technology, also sometimes referred to as "rendering." With the ongoing development of rendering technology, computer-generated graphic images not only have come to appear more realistic in basic features, but they have also come to be more realistic in terms of such features as color, lighting/shadowing, etc. As a result, it has become more difficult over the years to distinguish image forgery. Therefore, detecting computer graphics in images has become a significant issue in such areas as criminal investigation, journalism, and intelligence.

SUMMARY OF EMBODIMENTS OF THE INVENTION

Various embodiments of the invention may be directed to identifying computer graphics in digital images and may include extracting a first set of features from an input digital image; extracting a second set of features from a prediction-error image derived from the input digital image; and applying a classification algorithm to the first set of features and the second set of features to determine if the combined sets of features indicate that the input digital image corresponds to computer graphics. One or both of the feature extractions may include applying a discrete transformation to decompose the input digital image into a set of sub-bands; and obtaining sets of moments of characteristic functions associated with the sub-bands and with the input digital image, wherein the sets of moments are used to form the set of features.

Various embodiments of the invention may be implemented in hardware, software, firmware, and/or combinations thereof.

BRIEF DESCRIPTION OF THE DRAWINGS

Various embodiments of the invention will be described below in conjunction with the attached drawings, in which.

DETAILED DESCRIPTION OF VARIOUS EMBODIMENTS OF THE INVENTION

Figure 1:
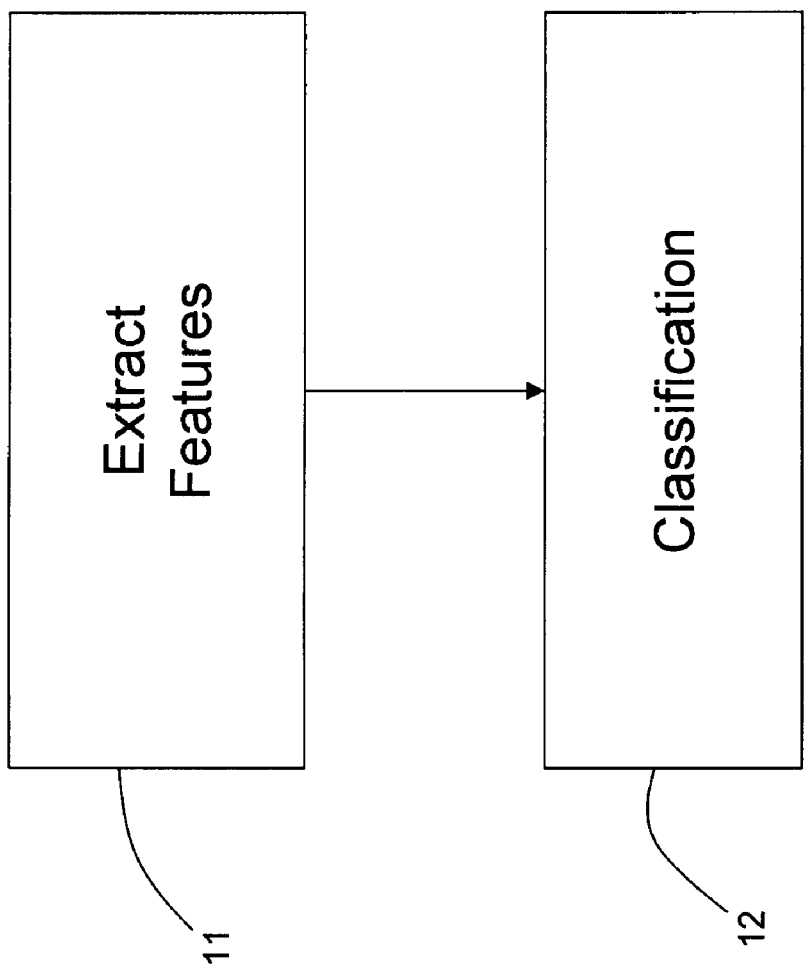
FIG. 1 shows a conceptual block representation/flowchart of various embodiments of the invention.

The detection of computer graphics may be addressed as a pattern recognition problem. This particular problem may be decomposed into a two-part process, as shown in FIG. 1: to extract a set of appropriate features 11 and to pass those features through an appropriate classifier 12 to distinguish computer graphics (CG) from photographic images (PI).

In one approach to the extraction of features, moments of wavelet characteristic functions may be used to form, for example, 78-dimensional feature vectors for use in image detection. This approach to extracting features is shown in FIG. 2.

Figure 2:
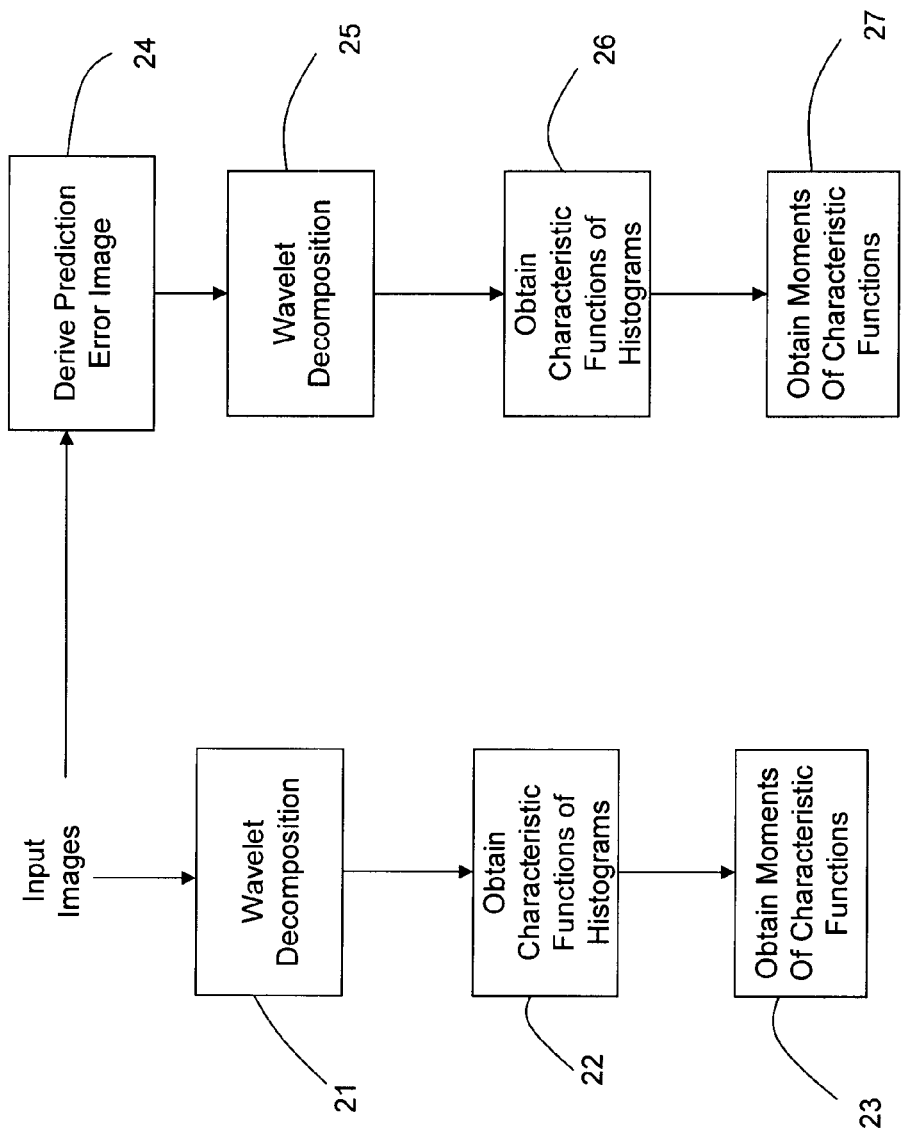
FIG. 2 presents a conceptual flowchart of feature extraction according to various embodiments of the invention.

As noted in FIG. 2, there may be a set of features derived based on the image and a set of features derived from a prediction-error image that may be derived from the image. These, together, may form the overall set of features.

As shown in FIG. 2, the input images may undergo wavelet decomposition 21. In the exemplary embodiment, in which 78-dimensional feature vectors may be obtained, a three-level wavelet transform may be used; however, the invention need not be limited to three-level transforms. However, for the purposes of this discussion, a three-level discrete wavelet transform (DWT) will be the assumed example. Such a three-level DWT may be used to provide twelve sub-bands, denoted by $LL_i$, $HL_i$, $LH_i$, and $HH_i$, where i=1, 2, 3. In an exemplary embodiment, a three-level Haar DWT may be used; however, the invention need not be limited to this example.

The histogram of a digital image or a wavelet sub-band may be used to reflect the probability mass function (pmf) of the image or wavelet sub-band, if the image values or the wavelet coefficient values, respectively, are treated as a random variable. Therefore, the process may next take the digital image and its sub-bands, obtained via the wavelet decomposition 21, obtain corresponding histograms, and take their characteristic functions 22, where a characteristic function may be obtained by taking the discrete Fourier transform (DFT) of a histogram. A characteristic function (corresponding to one of the thirteen sets of image data being considered in this exemplary embodiment, the image and its sub-bands), will be denoted H(f), where f may represent frequency.

After obtaining characteristic functions 22, statistical moments of the characteristic functions may be obtained 23 to provide the desired features. The n-th statistical moment, $M_n$, of a characteristic function, H(f), may be defined as follows.

$$M_n = \left(\sum_{k=1}^{N/2} f_k^n |H(f_k)|\right) \bigg/ \left(\sum_{k=1}^{N/2} |H(f_k)|\right) \quad (1)$$

where $|H(f_k)|$ is the magnitude of the characteristic function and N is the total number of discrete value levels of the image pixels.

In an exemplary embodiment, a set of 39 derived features may include the $1^{st}$, $2^{nd}$ and $3^{rd}$ moments of the characteristic functions of 13 sub-bands (the image itself, $LL_1$, $HL_1$, $LH_1$, $HH_1$, $LL_2$, $HL_2$, $LH_2$, $HH_2$, $LL_3$, $HL_3$, $LH_3$, $HH_3$), as discussed above.

Figure 3:
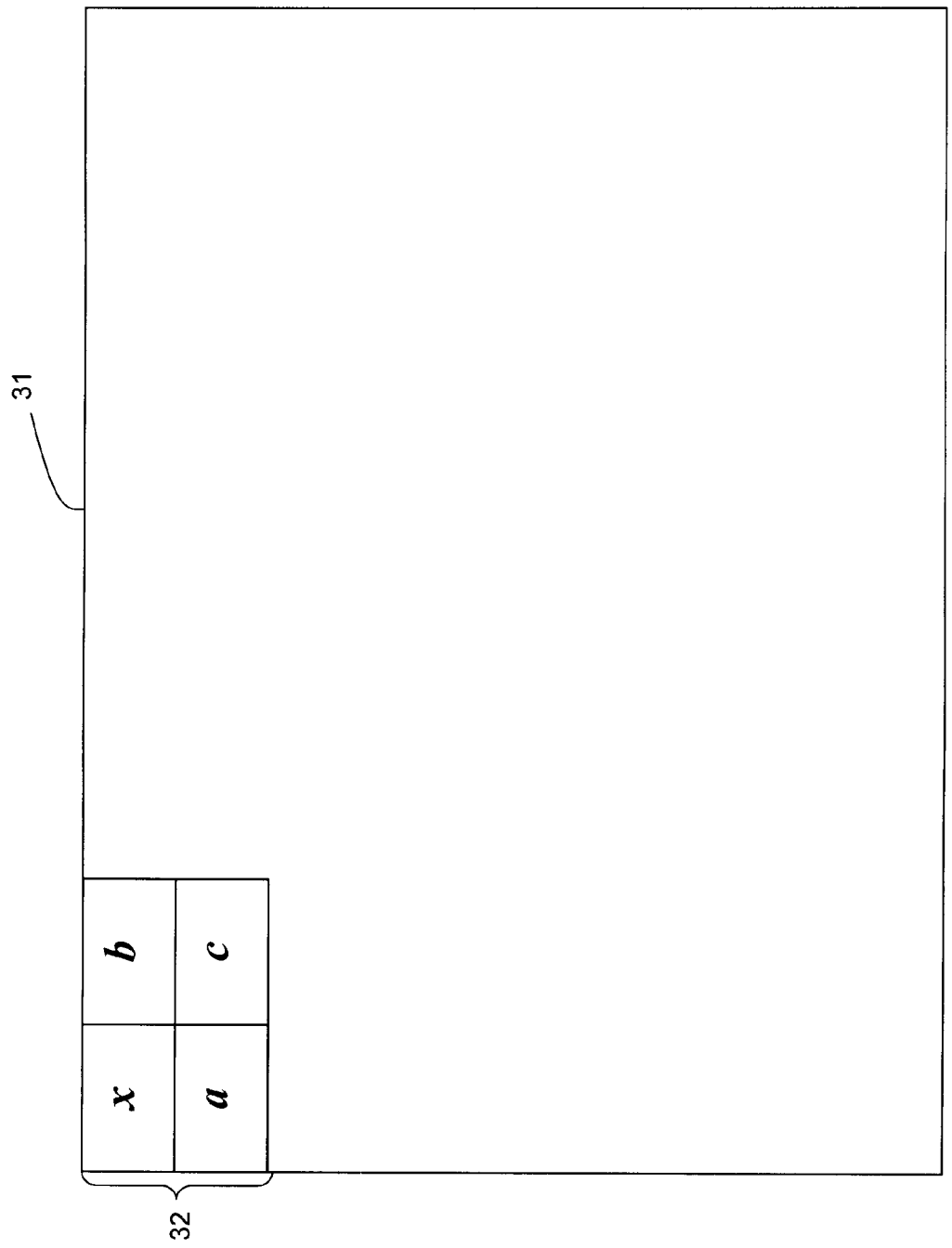
FIG. 3 depicts the use of image pixels to obtain a pixel prediction according to some embodiments of the invention.

A second set of 39 features, again, using the exemplary embodiment, may be similarly generated for a prediction-error image. One exemplary prediction algorithm, found in M. Weinberger et al., "LOCOI: A Low-Complexity Context-Based Lossless Image Compression Algorithm," *Proc. IEEE Data Compression Conf.*, 1996, pp. 140-149, that may be used in some embodiments of the invention may be expressed as follows:

$$\hat{x} = \begin{cases} \max(a, b) & c \leq \min(a, b) \\ \min(a, b) & c \geq \max(a, b) \\ a + b - c & \text{others} \end{cases} \quad (2)$$

where $\hat{x}$ is the prediction value of the pixel x under the consideration. The pixels, a, b, and c, are three neighboring pixels within an image 31, as shown in FIG. 3. The locations of a, b, and c for this algorithm can be illustrated as shown by the sub-image 32. Prediction error may be obtained by taking the difference between the pixel value in the input image and $\hat{x}$ corresponding to that pixel value. In such a manner, a prediction-error image may thus be obtained 24.

Following the generation of the prediction-error image 24, wavelet decomposition 25, generation of characteristic functions for histograms 26, and obtaining moments of the characteristic functions 27 may be performed similarly to the corresponding operations for the input image. In the exemplary embodiment, this results in another 39 features (i.e., first, second, and third moments for each of the prediction-error image and twelve sub-bands obtained via wavelet decomposition), for a total of 78 features obtained from a given image.

Color images may be represented in a variety of different color spaces, such as RGB (red, green, blue), GLHS (general LHS (lightness, hue and saturation)), HSV (hue, saturation, and values (brightness)), HLS (hue, lightness, and saturation), and HSI (hue, saturation, and intensity), and $YC_rC_b$ (luminance and chrominance). While various embodiments of the invention may use HSV and/or $YC_rC_b$ as their color models, the invention need not be limited to only those models.

Figure 4:
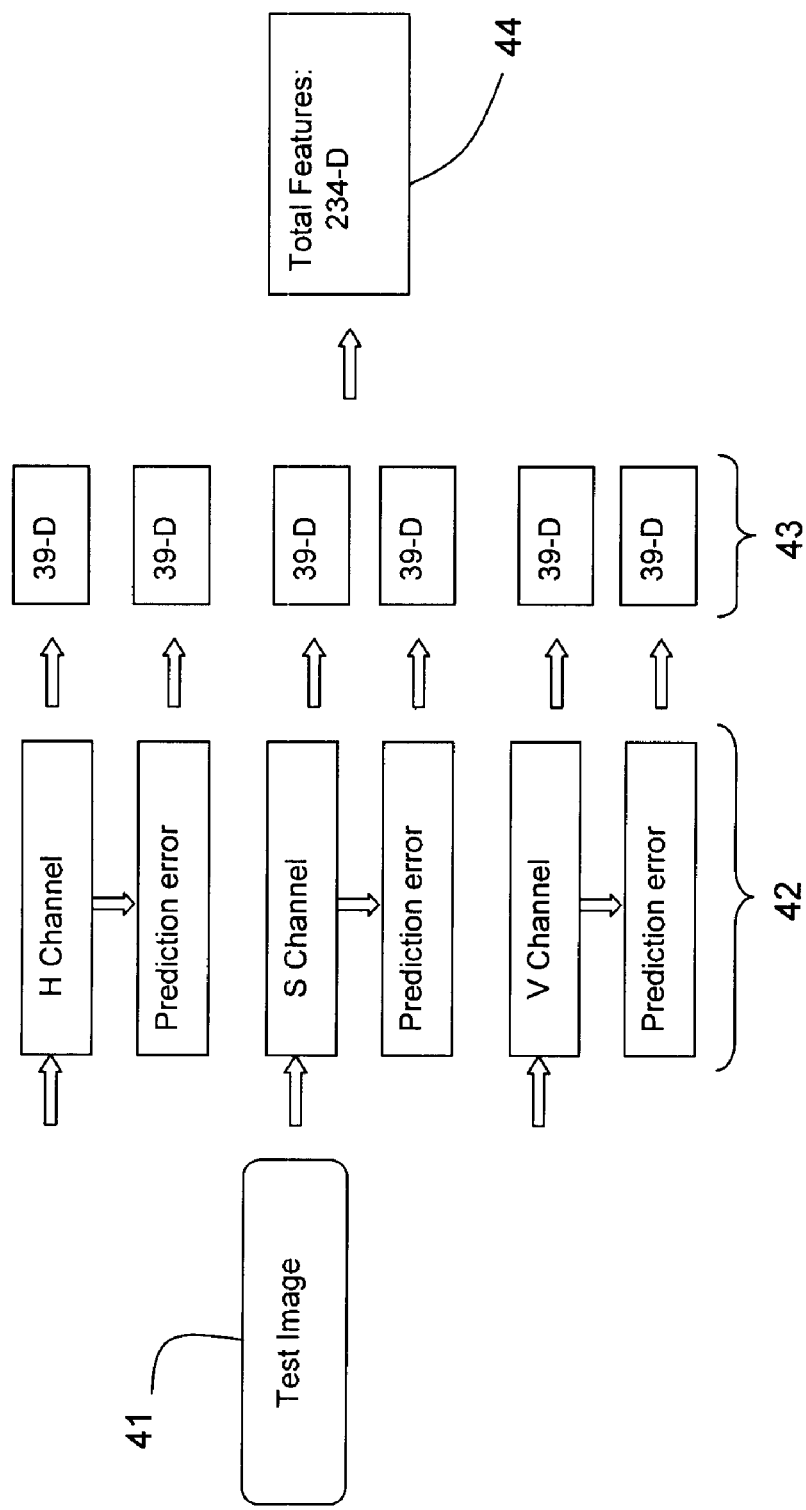
FIG. 4 gives a further conceptual presentation of feature extraction according to various embodiments of the invention.

The feature extraction process is illustrated in FIG. 4 for the case in which the HSV model is used (as noted above, the invention is not intended to be thus limited, and $YC_rC_b$ or other models may also be used). The color test image (for example, photo or graphics) 41 may first be represented in H (hue), S (saturation) and V (values (brightness)) channels 42. Then, for each channel, its prediction error image may be obtained 42 based on the prediction model of Equation (2), above, or on another appropriate prediction model. The three-level wavelet decomposition may then be performed for each channel and for its associated prediction error image, resulting, again in the case of a three-level DWT (to which the invention is not limited) in thirteen sub-bands (including the original channel/prediction error image). For each sub-band, the first three moments of characteristic function may be derived, as in Equation (1), resulting in 39 features 43; note that the invention is not limited to the case of the first three moments, and other numbers of moments may be used. Thus, for the three-level DWT case, one may obtain, for the three channels, a total of 234 features 44.

It may be additionally shown that feature efficiency may vary for different color models used with a given image or type of image. Therefore, one may apply a genetic optimization algorithm to determine an optimal color space.

In an exemplary embodiment, one may derive a color model from the RGB color model using the following formula:

$$\begin{bmatrix} C1 \\ C2 \\ C3 \end{bmatrix} = \begin{bmatrix} a1 & a2 & a3 \\ a4 & a5 & a6 \\ a7 & a8 & a9 \end{bmatrix} \begin{bmatrix} R \\ G \\ B \end{bmatrix} + \begin{bmatrix} a10 \\ a11 \\ a12 \end{bmatrix}$$

There are twelve matrix elements a1, a2, ..., a12, in the above formula. That is to say, one need only determine a finite number of matrix elements in order to determine a specific color model from the RGB model. One may use, for example, a continuous genetic algorithm to search for an optimal color model that can lead to the best performance in detecting computer graphics from photographic images based on a graphics/photographs database sufficient to cover a sufficiently broad range of possible images (i.e., based on the images to which one expects to apply the particular embodiment of the invention). According to the genetic algorithm, one may use "crossover" followed by "mutation" procedures iteratively to select optimal matrix elements. The "fitness measure" in this framework may be the correct detection rate, the balance between true positive and true negative, etc., and/or combinations thereof; the invention is not limited to any particular fitness measure.

Furthermore, once the features have been derived, it is possible that there may be redundant or unnecessary features among the derived features. Genetic algorithms may also be applied to the derived feature set to obtain a reduced feature set. In one particular example, in which a $YC_rC_b$ was used, the 234-dimensional feature set was reduced to a set of 117 features without significant degradation in classification performance.

In a particular embodiment of the invention, this may, once again, be done based on a sufficient graphics/photographs database, which may be similar to that discussed above. In this application of a genetic algorithm, one may use "crossover" followed by "mutation" procedures iteratively to select an optimal subset of features. The "fitness measure" in this framework may be the correct detection rate, the balance between true positive and true negative, etc., and/or combinations thereof; the invention is not limited to any particular fitness measure. The occurrence of each feature may then be counted, and the most frequently occurring features may be selected to form an optimal feature subset.

Returning now to FIG. 1, classification 12 may be performed on the features extracted in feature extraction 11. In some embodiments of the invention, feature classification 12 may be implemented by means of a support vector machine (SVM) with a polynomial kernel. However, the invention need not be limited to this particular form of classifier, and, for example, other kernels and/or other classifiers (e.g., neural network-based classifiers, etc.) may be employed.

Figure 5:
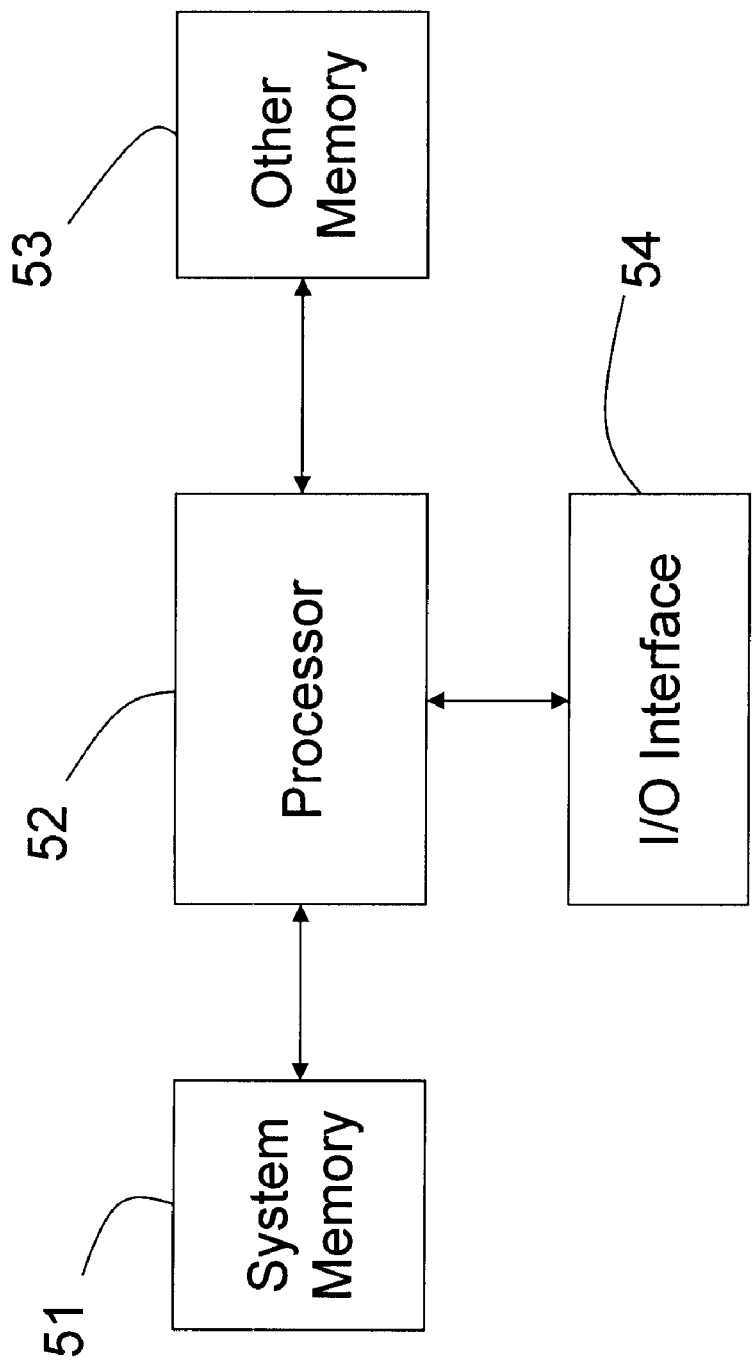
FIG. 5 shows a conceptual block diagram of a system that may be used to implement various embodiments of the invention.

Various embodiments of the invention may comprise hardware, software, and/or firmware. FIG. 5 shows an exemplary system that may be used to implement various forms and/or portions of embodiments of the invention. Such a computing system may include one or more processors 52, which may be coupled to one or more system memories 51. Such system memory 51 may include, for example, RAM, ROM, or other such machine-readable media, and system memory 51 may be used to incorporate, for example, a basic I/O system (BIOS), operating system, instructions for execution by processor 52, etc. The system may also include further memory 53, such as additional RAM, ROM, hard disk drives, or other processor-readable media. Processor 52 may also be coupled to at least one input/output (I/O) interface 54. I/O interface 54 may include one or more user interfaces, as well as readers for various types of storage media and/or connections to one or more communication networks (e.g., communication interfaces and/or modems), from which, for example, software code may be obtained.

Various embodiments of the invention have been presented above. However, the invention is not intended to be limited to the specific embodiments presented, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A method of determining whether a digital image is either a computer graphics image or a digital photographic image, the method comprising:
   extracting a first set of features from an input digital image, said extracting comprising:
      applying a discrete transformation to decompose the input digital image into a set of sub-bands;
      forming characteristic functions associated with the sub-bands and with the input digital image; and
      obtaining sets of moments based at least on the characteristic functions associated with the sub-bands and with the input digital image, wherein said sets of moments are used to form said first set of features;
   extracting a second set of features from a prediction-error image derived from said input digital image; and
   applying a classification algorithm to said first set of features and said second set of features to determine if the combined sets of features indicate that the input digital image is a computer graphics image or is a digital photographic image.

2. The method of claim 1, wherein said extracting a second set of features from a prediction-error image comprises:
   applying a discrete transformation to decompose the prediction-error image into a set of sub-bands; and
   obtaining sets of moments of characteristic functions associated with the sub-bands and with the prediction-error image, wherein said sets of moments are used to form said second set of features.

3. The method of claim 1, wherein said discrete transformation comprises a discrete wavelet transform.

4. The method of claim 3, wherein said discrete wavelet transform comprises a Haar discrete wavelet transform.

5. The method of claim 1, wherein said extracting a first set of features from an input digital image further comprises:
   forming an image histogram associated with each sub-band; and
   wherein said forming characteristic functions comprises forming the characteristic function associated with each sub-band based on the associated image histogram of that sub-band.

6. The method of claim 1, further comprising:
   forming said prediction-error image, wherein each pixel of the image is predicted based on three of its neighboring pixels.

7. The method of claim 1, further comprising:
   decomposing said input digital image according to a color model prior to performing said extracting the first set of features and extracting the second set of features, wherein said extracting the first set of features and extracting the second set of features are applied individually to each component of said color model to obtain a set of features associated with said component.

8. The method of claim 7, wherein said color model is selected from the group consisting of the HSV color model and the $YC_rC_b$ color model.

9. The method of claim 1, further comprising:
   applying a genetic algorithm to said first and second sets of features obtained based on a digital image database to obtain a revised set of features prior to said applying a classification algorithm; and
   selecting a subset of said first and second sets of features obtained from said input digital image based on said revised set of features;
   wherein said applying a classification algorithm applies the classification algorithm to said subset as said combined sets of features.

10. The method of claim 1, further comprising:
    downloading over a communication network software code that, upon execution by a processor, causes the processor to implement said extracting a first set of features, said extracting a second set of features, and said applying a classification algorithm.

11. The method of claim 1, further comprising:
    making available for downloading over a communication network software code that, upon execution by a processor, causes the processor to implement said extracting a first set of features, said extracting a second set of features, and said applying a classification algorithm.

12. A processor-readable storage device containing software code that, upon execution by a processor, causes the implementation of operations for determining whether a digital image is either a computer graphics image or a digital photographic image, the operations comprising:
    extracting a first set of features from an input digital image, said extracting comprising:
       applying a discrete transformation to decompose the input digital image into a set of sub-bands;
       forming characteristic functions associated with the sub-bands and with the input digital image; and
       obtaining sets of moments based at least on the characteristic functions associated with the sub-bands and with the input digital image, wherein said sets of moments are used to form said first set of features;
    extracting a second set of features from a prediction-error image derived from said input digital image; and
    applying a classification algorithm to said first set of features and said second set of features to determine if the combined sets of features indicate that the input digital image is a computer graphics image or is a digital photographic image.

13. The device of claim 12, wherein said extracting a second set of features from a prediction-error image comprises:
    applying a discrete transformation to decompose the prediction-error image into a set of sub-bands; and
    obtaining sets of moments of characteristic functions associated with the sub-bands and with the prediction-error image, wherein said sets of moments are used to form said second set of features.

14. The device of claim 12, wherein said discrete transformation comprises a discrete wavelet transform.

15. The device of claim 14, wherein said discrete wavelet transform comprises a Haar discrete wavelet transform.

16. The device of claim 12, wherein said extracting a first set of features from an input digital image further comprises:
    forming an image histogram associated with each sub-band; and
    wherein said forming characteristic functions comprises forming the characteristic function associated with each sub-band based on the associated image histogram of that sub-band.

17. The device of claim 12, wherein said software code, upon execution by a processor, further causes the operations to comprise:
    forming said prediction-error image, wherein each pixel of the image is predicted based on three of its neighboring pixels.

18. The device of claim 12, wherein said software code, upon execution by a processor, further causes the operations to comprise:
  decomposing said input digital image according to a color model prior to performing said extracting the first set of features and extracting the second set of features, wherein said extracting the first set of features and extracting the second set of features are applied individually to each component of said color model to obtain a set of features associated with said component.

19. The device of claim 18, wherein said color model is selected from the group consisting of the HSV color model and the $YC_rC_b$ color model.

20. The device of claim 12, wherein said software code, upon execution by a processor, further causes the operations to comprise:
  applying a genetic algorithm to said first and second sets of features obtained based on a digital image database to obtain a revised set of features prior to said applying a classification algorithm; and
  selecting a subset of said first and second sets of features obtained from said input digital image based on said revised set of features;
  wherein said applying a classification algorithm applies the classification algorithm to said subset as said combined sets of features.

21. A method of identifying computer graphics in digital images, the method comprising:
  decomposing an input digital image according to a color model, wherein the color model is selected according to a genetic algorithm;
  extracting a first set of features from said input digital image, said extracting comprising:
    applying a discrete transformation to decompose the input digital image into a set of sub-bands;
    forming characteristic functions associated with the sub-bands and with the input digital image; and
    obtaining sets of moments based at least on the characteristic functions associated with the sub-bands and with the input digital image, wherein said sets of moments are used to form said first set of features;
    wherein said applying, said forming, and said obtaining are applied individually to respective components of said color model to obtain a respective set of first features associated with a respective component of said color model;
  extracting a second set of features from a prediction-error image derived from said input digital image, wherein said extracting a second set of features is applied individually to respective components of said color model to obtain a respective set of first features associated with a respective component of said color model; and
  applying a classification algorithm to said first set of features and said second set of features to determine if the combined sets of features indicate that the input digital image corresponds to computer graphics.

22. The method of claim 21, wherein said extracting a second set of features from a prediction-error image comprises:
  applying a discrete transformation to decompose the prediction-error image into a set of sub-bands; and
  obtaining sets of moments of characteristic functions associated with the sub-bands and with the prediction-error image, wherein said sets of moments are used to form said second set of features.

23. The method of claim 21, wherein said discrete transformation comprises a discrete wavelet transform.

24. The method of claim 23, wherein said discrete wavelet transform comprises a Haar discrete wavelet transform.

25. The method of claim 21, wherein said extracting a first set of features from an input digital image further comprises:
  forming an image histogram associated with each sub-band; and
  wherein said forming characteristic functions comprises forming the characteristic function associated with each sub-band based on the associated image histogram of that sub-band.

26. The method of claim 21, further comprising:
  forming said prediction-error image, wherein each pixel of the image is predicted based on three of its neighboring pixels.

27. The method of claim 21, wherein said color model is selected from the group consisting of the HSV color model and the $YC_rC_b$ color model.

28. The method of claim 21, further comprising:
  making available for downloading over a communication network software code that, upon execution by a processor, causes the processor to implement said extracting a first set of features, said extracting a second set of features, and said applying a classification algorithm.

29. The method of claim 21, further comprising:
  applying a genetic algorithm to said first and second sets of features obtained based on a digital image database to obtain a revised set of features prior to said applying a classification algorithm; and
  selecting a subset of said first and second sets of features obtained from said input digital image based on said revised set of features;
  wherein said applying a classification algorithm applies the classification algorithm to said subset as said combined sets of features.

30. The method of claim 21, further comprising:
  downloading over a communication network software code that, upon execution by a processor, causes the processor to implement said extracting a first set of features, said extracting a second set of features, and said applying a classification algorithm.

31. A processor-readable storage device containing software code that, upon execution by a processor, causes the implementation of operations for identifying computer graphics in digital images, the operations comprising:
  decomposing an input digital image according to a color model, wherein the color model is selected according to a genetic algorithm;
  extracting a first set of features from said input digital image, said extracting comprising:
    applying a discrete transformation to decompose the input digital image into a set of sub-bands;
    forming characteristic functions associated with the sub-bands and with the input digital image; and
    obtaining sets of moments based at least on the characteristic functions associated with the sub-bands and with the input digital image, wherein said sets of moments are used to form said first set of features;
    wherein said applying, said forming, and said obtaining are applied individually to respective components of said color model to obtain a respective set of first features associated with a respective component of said color model;
  extracting a second set of features from a prediction-error image derived from said input digital image, wherein said extracting a second set of features is applied individually to respective components of said color model to obtain a respective set of first features associated with a respective component of said color model; and applying a classification algorithm to said first set of features and said second set of features to determine if the combined sets of features indicate that the input digital image corresponds to computer graphics.

32. The device of claim 31, wherein said extracting a second set of features from a prediction-error image comprises:

applying a discrete transformation to decompose the prediction-error image into a set of sub-bands; and obtaining sets of moments of characteristic functions associated with the sub-bands and with the prediction-error image, wherein said sets of moments are used to form said second set of features.

33. The device of claim 31, wherein said discrete transformation comprises a discrete wavelet transform.

34. The device of claim 33, wherein said discrete wavelet transform comprises a Haar discrete wavelet transform.

35. The device of claim 31, wherein said extracting a first set of features from an input digital image further comprises:

forming an image histogram associated with each sub-band; and wherein said forming characteristic functions comprises forming the characteristic function associated with each sub-band based on the associated image histogram of that sub-band.

36. The device of claim 31, wherein said software code, upon execution by a processor, further causes the operations to comprise:

forming said prediction-error image, wherein each pixel of the image is predicted based on three of its neighboring pixels.

37. The device of claim 31, wherein said color model is selected from the group consisting of the HSV color model and the $YC_rC_b$ color model.

38. The device of claim 31, wherein said software code, upon execution by a processor, further causes the operations to comprise:

applying a genetic algorithm to said first and second sets of features obtained based on a digital image database to obtain a revised set of features prior to said applying a classification algorithm; and selecting a subset of said first and second sets of features obtained from said input digital image based on said revised set of features;

wherein said applying a classification algorithm applies the classification algorithm to said subset as said combined sets of features.

39. A method of distinguishing computer graphics from digital photographic images, the method comprising:

extracting a first set of features from an input digital image, said extracting comprising:

applying a discrete transformation to decompose the input digital image into a set of sub-bands;

forming characteristic functions associated with the sub-bands and with the input digital image; and obtaining sets of moments based at least on the characteristic functions associated with the sub-bands and with the input digital image, wherein said sets of moments are used to form said first set of features;

extracting a second set of features from a prediction-error image derived from said input digital image; and applying a classification algorithm to said first set of features and said second set of features to determine if the combined sets of features indicate that the input digital image includes computer graphics or is a digital photographic image.

decomposing said input digital image according to a color model prior to performing said extracting the first set of features and extracting the second set of features, wherein said extracting the first set of features and extracting the second set of features are applied individually to each component of said color model to obtain a set of features associated with said component; and wherein said color model is selected using a genetic algorithm.

40. A processor-readable storage device containing software code that, upon execution by a processor, causes the implementation of operations for distinguishing computer graphics from digital photographic images, the operations comprising:

extracting a first set of features from an input digital image, said extracting comprising:

applying a discrete transformation to decompose the input digital image into a set of sub-bands;

forming characteristic functions associated with the sub-bands and with the input digital image; and obtaining sets of moments based at least on the characteristic functions associated with the sub-bands and with the input digital image, wherein said sets of moments are used to form said first set of features;

extracting a second set of features from a prediction-error image derived from said input digital image, comprising:

applying a discrete transformation to decompose the prediction-error image into a set of sub-bands; and obtaining sets of moments of characteristic functions associated with the sub-bands and with the prediction-error image, wherein said sets of moments are used to form said second set of features;

applying a classification algorithm to said first set of features and said second set of features to determine if the combined sets of features indicate that the input digital image includes computer graphics or is a digital photographic image;

wherein said software code, upon execution by a processor, further causes the operations to comprise:

decomposing said input digital image according to a color model prior to performing said extracting the first set of features and extracting the second set of features, wherein said extracting the first set of features and extracting the second set of features are applied individually to each component of said color model to obtain a set of features associated with said component; and wherein said color model is selected using a genetic algorithm.

* * * * *

UNITED STATES PATENT AND TRADEMARK OFFICE
CERTIFICATE OF CORRECTION

PATENT NO.        : 8,041,124 B2                                     Page 1 of 1
APPLICATION NO.   : 11/624595
DATED             : October 18, 2011
INVENTOR(S)       : Shi et al.

It is certified that error appears in the above-identified patent and that said Letters Patent is hereby corrected as shown below:

Column 10, line 7, in Claim 39, delete "image." and insert -- image; --.

Signed and Sealed this
Nineteenth Day of June, 2012

David J. Kappos
*Director of the United States Patent and Trademark Office*